(12) United States Patent
Fox et al.

(10) Patent No.: US 7,330,912 B1
(45) Date of Patent: Feb. 12, 2008

(54) CONFIGURATION IN A CONFIGURABLE SYSTEM ON A CHIP

(75) Inventors: Brian Fox, Sunnyvale, CA (US); Andreas Papaliolios, Sunnyvale, CA (US)

(73) Assignee: Xilinx, Inc., San Jose, CA (US)

(*) Notice: Subject to any disclaimer, the term of this patent is extended or adjusted under 35 U.S.C. 154(b) by 300 days.

(21) Appl. No.: 11/016,427

(22) Filed: Dec. 16, 2004

Related U.S. Application Data

(62) Division of application No. 09/419,386, filed on Oct. 15, 1999, now Pat. No. 6,851,047.

(51) Int. Cl.
*G06F 3/00* (2006.01)

(52) U.S. Cl. .............................. 710/8; 710/14; 710/62; 710/65; 710/71

(58) Field of Classification Search ............... None
See application file for complete search history.

(56) References Cited

U.S. PATENT DOCUMENTS

| | | | |
|---|---|---|---|
| 4,870,302 A | 9/1989 | Freeman | |
| 5,140,193 A | 8/1992 | Freeman | |
| 5,175,836 A | 12/1992 | Morgan | |
| RE34,363 E | 8/1993 | Freeman | |
| 5,307,480 A * | 4/1994 | Hwang | 714/22 |
| 5,361,373 A | 11/1994 | Gilson | |
| 5,402,014 A | 3/1995 | Ziklik et al. | |
| 5,448,493 A | 9/1995 | Topolewski et al. | |
| 5,464,003 A | 11/1995 | Kean | |
| 5,489,858 A | 2/1996 | Pierce et al. | |
| 5,499,385 A | 3/1996 | Farmwald et al. | |
| 5,504,439 A | 4/1996 | Tavana | |

(Continued)

FOREIGN PATENT DOCUMENTS

EP     0062431 A1     10/1982

(Continued)

OTHER PUBLICATIONS

Steve Farrer, "High Speed Numerics with the 80186/80188 and 8087," Intel Corporation Embedded Applications vol. 1, (1995), Application Note AP-258, pp. ix-xii and 4-1 to 4-18.

(Continued)

*Primary Examiner*—Kim Huynh
*Assistant Examiner*—Aurangzeb Hassan
(74) *Attorney, Agent, or Firm*—Blakely, Sokoloff, Taylor & Zafman, LLC; John J. King

(57) ABSTRACT

The present invention allows a user to customize the configuration sequence of a configurable system on a chip (CSoC), thereby adding considerable flexibility to the configuration process. The present invention also provides certain features, transparent to the user, which optimize system resources and ensure the correct initialization of the CSoC. The CSoC leverages an on-chip central processing unit (CPU) to control the configuration process of the configurable system logic (CSL). Advantageously, the CSL configuration memory cells as well as other programmable locations in the CSoC are addressable as part of a system bus address space. The system bus is a multi-use structure that can be used for both configuring and reading of memory cells. In this manner, the CSoC optimizes system resources.

19 Claims, 16 Drawing Sheets

U.S. PATENT DOCUMENTS

| | | | |
|---|---|---|---|
| 5,600,271 A | 2/1997 | Erickson et al. | |
| 5,668,815 A | 9/1997 | Gittinger et al. | |
| 5,677,638 A | 10/1997 | Young et al. | |
| 5,687,325 A | 11/1997 | Chang | |
| 5,710,891 A | 1/1998 | Normoyle et al. | |
| 5,774,684 A | 6/1998 | Haines et al. | |
| 5,834,947 A | 11/1998 | Cedar et al. | |
| 5,901,295 A | 5/1999 | Yazdy | |
| 5,911,082 A | 6/1999 | Monroe et al. | |
| 5,935,230 A | 8/1999 | Pinai et al. | |
| 5,936,424 A | 8/1999 | Young et al. | |
| 6,067,615 A | 5/2000 | Upton | |
| 6,085,317 A | 7/2000 | Smith | |
| 6,150,836 A | 11/2000 | Abbott | |
| 6,154,793 A | 11/2000 | MacKenna et al. | |
| 6,212,625 B1 | 4/2001 | Russell | |
| 6,259,693 B1 * | 7/2001 | Ganmukhi et al. | 370/366 |
| 6,282,627 B1 | 8/2001 | Wong et al. | |
| 6,347,346 B1 | 2/2002 | Taylor | |
| 6,349,346 B1 | 2/2002 | Hanrahan et al. | |
| 6,378,018 B1 * | 4/2002 | Tsern et al. | 710/313 |
| 6,467,009 B1 | 10/2002 | Winegarden et al. | |
| 6,624,656 B1 | 9/2003 | Fox et al. | |
| 6,691,266 B1 | 2/2004 | Winegarden et al. | |

FOREIGN PATENT DOCUMENTS

| | | |
|---|---|---|
| EP | 0306962 A2 | 3/1989 |
| EP | 0361525 A2 | 4/1990 |
| WO | WO 00/22546 | 10/1998 |

OTHER PUBLICATIONS

Intel Corporation, "Embedded Microprocessors: Intel386™ Processors, (1995), Intel376 Processors and Peripherals, 80186/80188 Family," pp. ix-x and 1-1 to 1-32.

Intel Corporation, "Peripheral Components: Chip Sets, PC I/O Peripherals, Memory Controllers, Keyboard Controllers, Support Peripherals," pp. ix-xi and 1-57 to 1-247 (1995).

IBM Technical Disclosure Bulletin, vol. 26, No. 3B; Aug. 1983; pp. 1531-1532.

* cited by examiner

CONFIGURATION IN A CONFIGURABLE SYSTEM ON A CHIP

BACKGROUND OF THE INVENTION

1. Field of the Invention

The present invention relates generally to a configurable system on a chip (CSoC), and specifically to structures and methods regarding the configuration of the CSoC.

2. Description of the Related Art

Programmable logic devices, such as field programmable logic devices (FPLDs), are programmed to perform user-specified logic functions by loading configuration data into the FPLD. This configuration data is typically loaded into the FPLD as a bitstream, i.e. a string of binary bits. Each bit programs a specific programmable resource on the device. Thus, some bits configure the logic blocks which perform the user-defined logic functions, other bits configure the input/output blocks which interface to devices external to the FPGA, and yet other bits configure the programmable interconnect that connects the logic blocks and the input/output blocks.

Typically, the configuration data is stored in a nonvolatile memory device and loaded into the FPLD upon device power-up. The configuration information is loaded into the FPLD in data frames using a shift register. This shift register has N serially coupled one-bit shift registers, each register clocked by the same clock signal. As the bitstream is serially shifted into the shift register, the bits of the shift register are bit shifted downstream in a synchronized manner.

Once the shift register is fully loaded, thereby indicating a frame of data is complete, the stored N bits are transferred simultaneously via dedicated lines to some of the configuration memory cells. Typically, the configuration memory cells are in an array, wherein a frame of data corresponds to one column of configuration memory cells in that array. After the write cycle is complete, the loading of another frame of configuration data begins. These store and write cycles continue until all of the bits of the configuration bitstream are written into the FPLD.

Certain programming limitations are inherent in such FPLDs. For example, because each bit corresponds to a specific programmable resource and each frame of configuration data is loaded in a fixed sequence, reconfiguration of many FPLDs is an "all or nothing" process. In other words, because there is no way to restrict reconfiguration to a part of the device, the entire bitstream must be reloaded into the FPLD. Moreover, the shift register and dedicated lines take up valuable silicon real estate.

Therefore, a need arises for a structure and method of providing programmable logic solutions, while at the same time ensuring more efficient use of silicon and system resources.

SUMMARY OF THE INVENTION

The present invention allows a user to customize the configuration sequence of a configurable system on a chip (CSoC), thereby adding considerable flexibility to the configuration process. The present invention also provides certain features, transparent to the user, which optimize system resources and ensure the correct initialization of the CSoC.

In accordance with one aspect of the present invention, the CSoC leverages an on-chip central processing unit (CPU) to control the configuration process of the configurable system logic (CSL). Advantageously, the CSL configuration memory cells as well as other programmable locations in the CSoC are addressable as part of a system bus address space, thereby eliminating the dedicated configuration shift register of prior art FPLDs.

Moreover, the present invention provides that this system bus is a multi-use structure. Thus, the system bus of the CSoC may be used for both configuring and reading of memory cells. In this manner, the present invention substantially eliminates the configuration interconnect used in prior art FPLDs, thereby optimizing system resources.

In one embodiment, an on-chip direct memory access (DMA) controller controls the bus for configuring of the memory cells. Using the DMA controller as a bus master rather than the CPU reduces the number of clock cycles needed for configuration, thereby reducing power consumption. In another embodiment, the CPU controls the bus during both configuration and read modes, thereby reducing the number of on-chip components.

The present invention provides significant latitude to the user to customize the configuration process. For example, the user can select one clock during configuration of the CSL and another clock after configuration of the CSL. In one embodiment, the CPU initially sets key timing parameters to facilitate accessing the slowest available parallel memory device on the market and then accelerates the access as appropriate for the specific memory device or as selected by the user. Thus, the present invention advantageously provides the user maximum flexibility in the selection of the clock source, both in the configuration mode as well as in the user mode.

In accordance with the present invention, the user can also determine the initialization sequence of the CSoC. For example, global buffers used for clock, high fan-out, or reset signals can be selectively enabled in the sequence designated by the user. Other elements of CSoC, including but not limited to, registers, programmable inputs/outputs, and RAM can be selectively enabled in the same manner.

The present invention provides certain transparent features that provide optimal flexibility to the user. For example, an initialization sequence first checks for either a serial or a parallel external memory device coupled to a memory interface unit (MIU) in the CSoC. The CPU sets the MIU to an appropriate mode based on the type of external memory device. Then, the CPU searches for a header in the memory device. If the header is found, then the CSL is configured. If the header is not found, the MIU is switched to another mode. In one embodiment, if the header is not found in the new mode, then the present invention checks whether the memory device is accessible, powers down the CSoC if the memory device is accessible, and repeats the header search if the external memory device is not accessible.

Another aspect of the present invention is providing predetermined signals in the CSL until the completion of configuration. Special buffers in the general interconnect of the CSL, called zip buffers, provide this function. Zip buffers include first-tier and second tier multiplexers. Each first-tier multiplexer has input terminals coupled to a set of general interconnect lines. Each of the second-tier multiplexers has a first input terminal coupled to one output terminal of the first-tier multiplexers and a second input terminal coupled to a constant voltage source. The second-tier multiplexers selectively provide output signals from the first terminals or the second terminals to the logic block. Specifically, during the configuration mode, the second-tier multiplexers provide only constant signals to the logic block, thereby preventing contention within the logic block. During the user mode, the second-tier multiplexers provide signals from the general interconnect to the logic block.

The present invention also provides a unique input multiplexer to receive the signals provided by the zip buffers. The input multiplexer includes a first multiplexer that receives a first plurality of input signals and a constant signal, a second multiplexer that receives a second plurality of input signals and a mode signal, and a third multiplexer that receives output signals from the first and second multiplexers and provides an output signal on a logic block input line. The input multiplexer further includes a transistor coupled to the internal logic block line, wherein the first transistor is controlled by the mode signal. In one embodiment, the mode signal, which determines whether the logic block is in a configuration mode or a user mode, is generated by control logic in the CSL.

During configuration, the mode signal, the constant signal, and all input signals are identical. To provide further protection to the internal circuits of the CSL, the mode signal also turns on the transistor coupled to the internal logic block line. The transistor, which is further coupled to the constant signal, thereby provides this constant signal to the internal logic block line. In this manner, the present invention ensures that the internal logic of the CSL remains stable until configuration is complete.

Because the configuration memory is randomly accessible, just as any other memory on the CSoC, the configuration memory can be addressed in any order, thereby providing enhanced security and debug capabilities to the user. Additionally, the configuration memory can be easily addressed as subsets, thereby facilitating rapid reconfiguration. In one embodiment, a user may choose between various levels of security on the CSoC.

The present invention will be more fully understood in light of the following description and drawings.

BRIEF DESCRIPTION OF THE DRAWINGS

FIG. 5, comprising

DETAILED DESCRIPTION OF THE DRAWINGS

Figure 1:
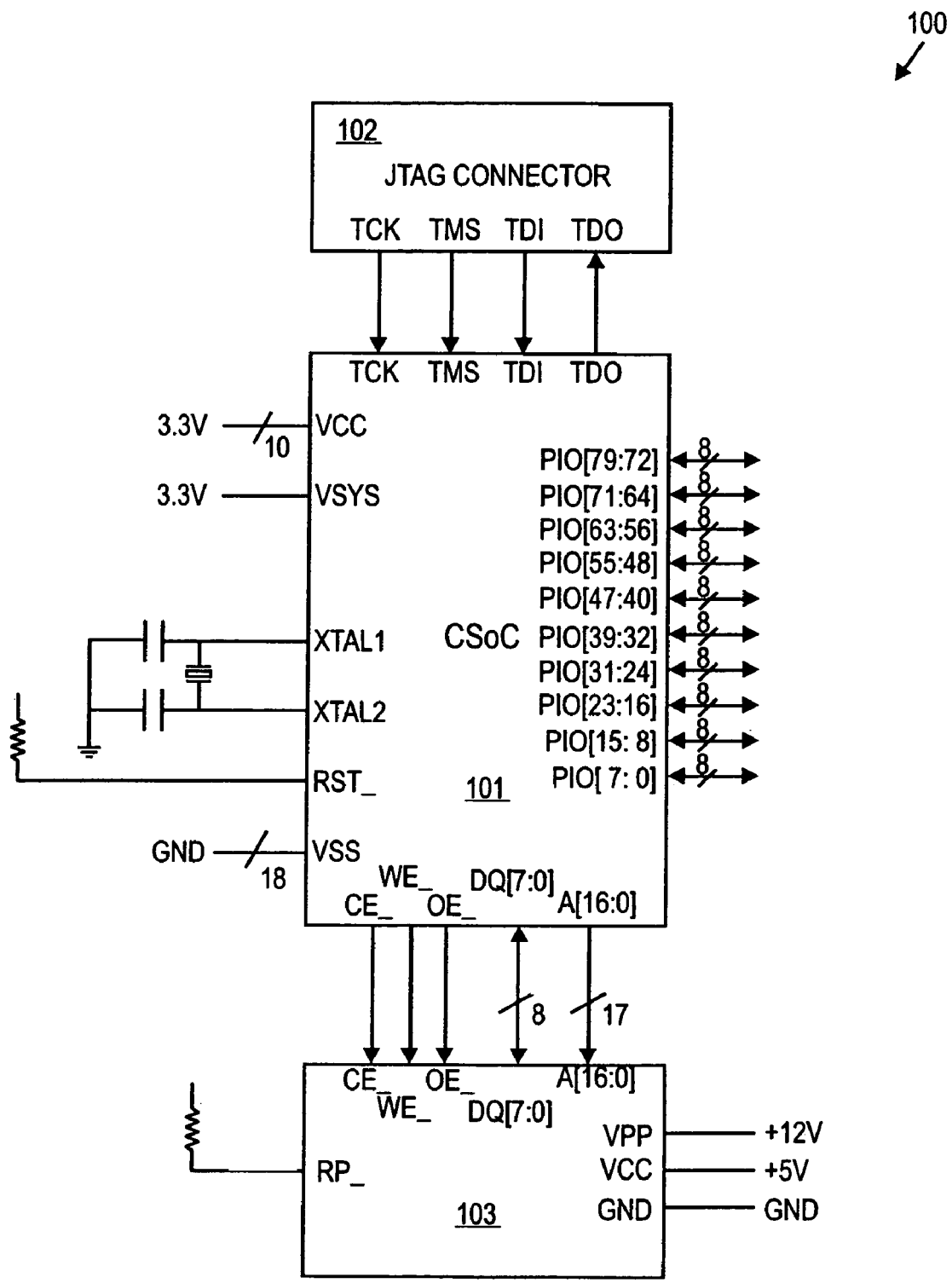
FIG. 1 illustrates a configurable system on a chip (CSoC) in a typical system environment.

A configurable system on a chip (CSoC) is a monolithic, integrated circuit device that performs a variety of microcontroller functions. FIG. 1 illustrates a CSoC 101 in a typical system environment 100. In this environment, a memory device 103, after receiving the appropriate chip enable (CE), write enable (WE), and output enable (OE) signals from CSoC 101, provides CSoC 101 with the configuration data for its programmable resources. In one embodiment, memory device 103 is a flash read only memory (ROM) which provides its output data in parallel. Note that other CSoC system embodiments may use other memory devices for configuration. These memory devices may be implemented in other technologies, such as erasable programmable read only memory (EPROM) or electrically erasable read only memory (EEPROM) technologies. Moreover, as described in more detail in reference to FIGS. 3A-3C, the memory device may be a serial device instead of a parallel device.

CSoC 101 is also connected to a JTAG connector 102. JTAG, an acronym for the Joint Test Action Group, refers to the IEEE Std 1149.1-1990 which defines a test access port and boundary scan architecture for digital integrated circuits. This standard is well known to those skilled in the art and therefore is not described in detail herein.

Figure 2:
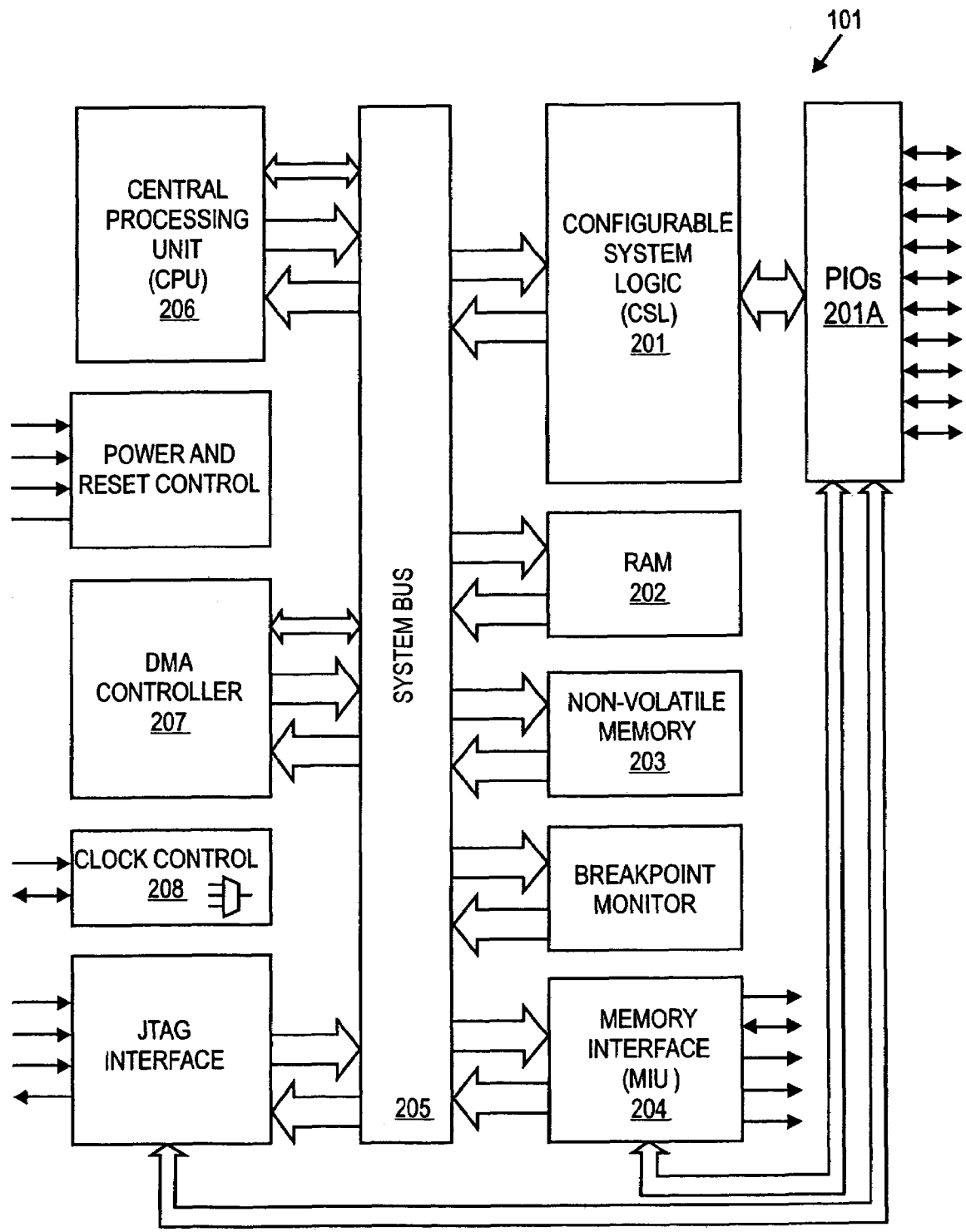
FIG. 2 shows a block diagram of the basic structures in a CSoC.

FIG. 2 illustrates the major structures of CSoC 101. CSoC 101 includes configurable system logic (CSL) 201, a programmable logic section to implement user-defined logic. CSL 201 is programmed by loading configuration memory cells (not shown). These configuration memory cells control the logic and general interconnect of CSL 201. A memory interface unit (MIU) 204 facilitates the transfer of the logic values for the configuration memory cells from an external memory (for example, memory device 103 (FIG. 1)) to CSL 201 via a system bus 205. A random access memory (RAM) 202 provides user memory in addition to that provided by CSL 201. Programmable inputs/outputs (PIOs) 201A provide connection between CSL 201 and other resources (not shown) external to CSoC 101.

Figure 3:
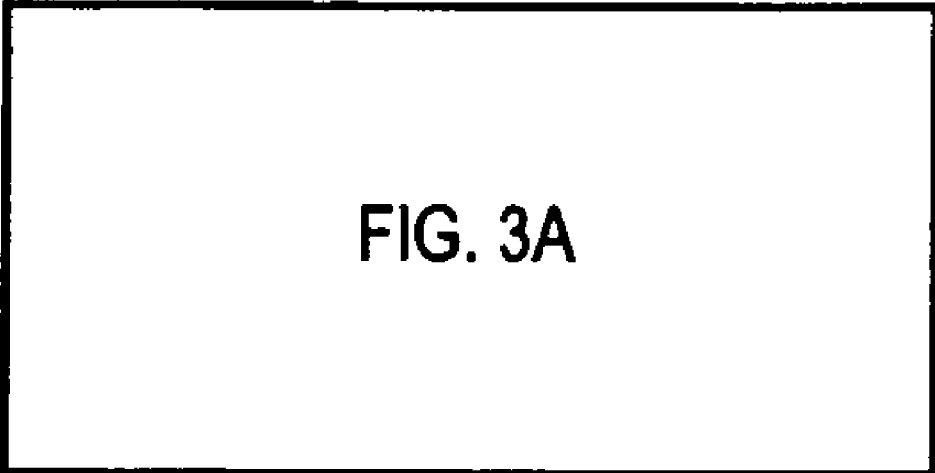
FIG. 3, comprising
Figure 3:
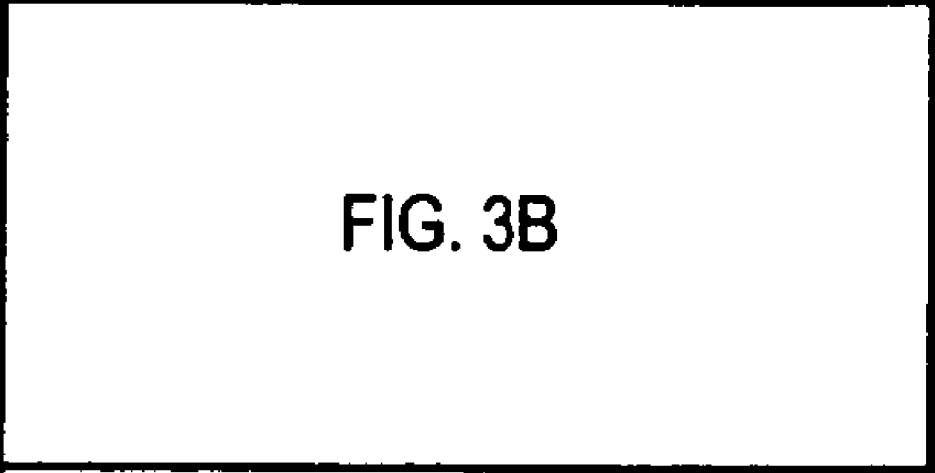
Figure 3:
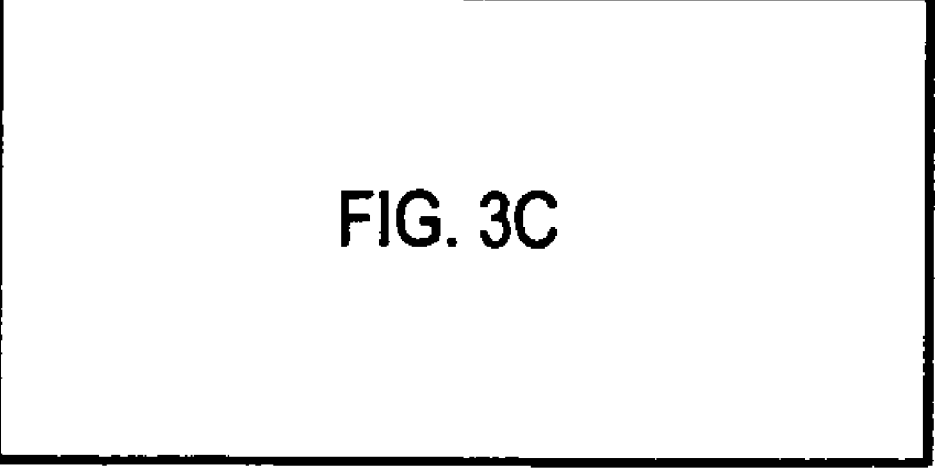
Figure 3A:
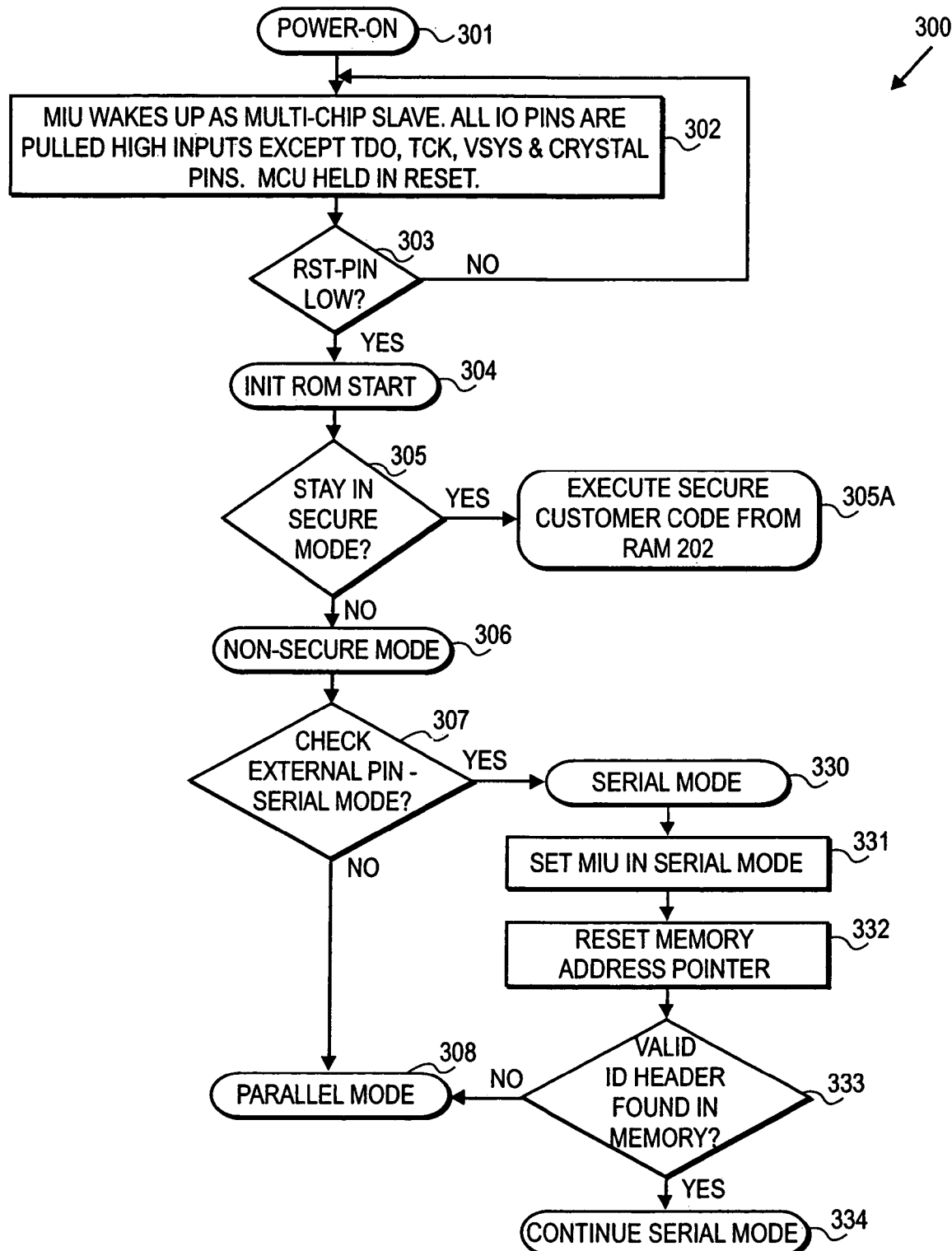
FIGS. 3A, 3B, and 3C, illustrates a flow chart of the configuration of a CSoC in both a parallel and series mode.
Figure 3B:
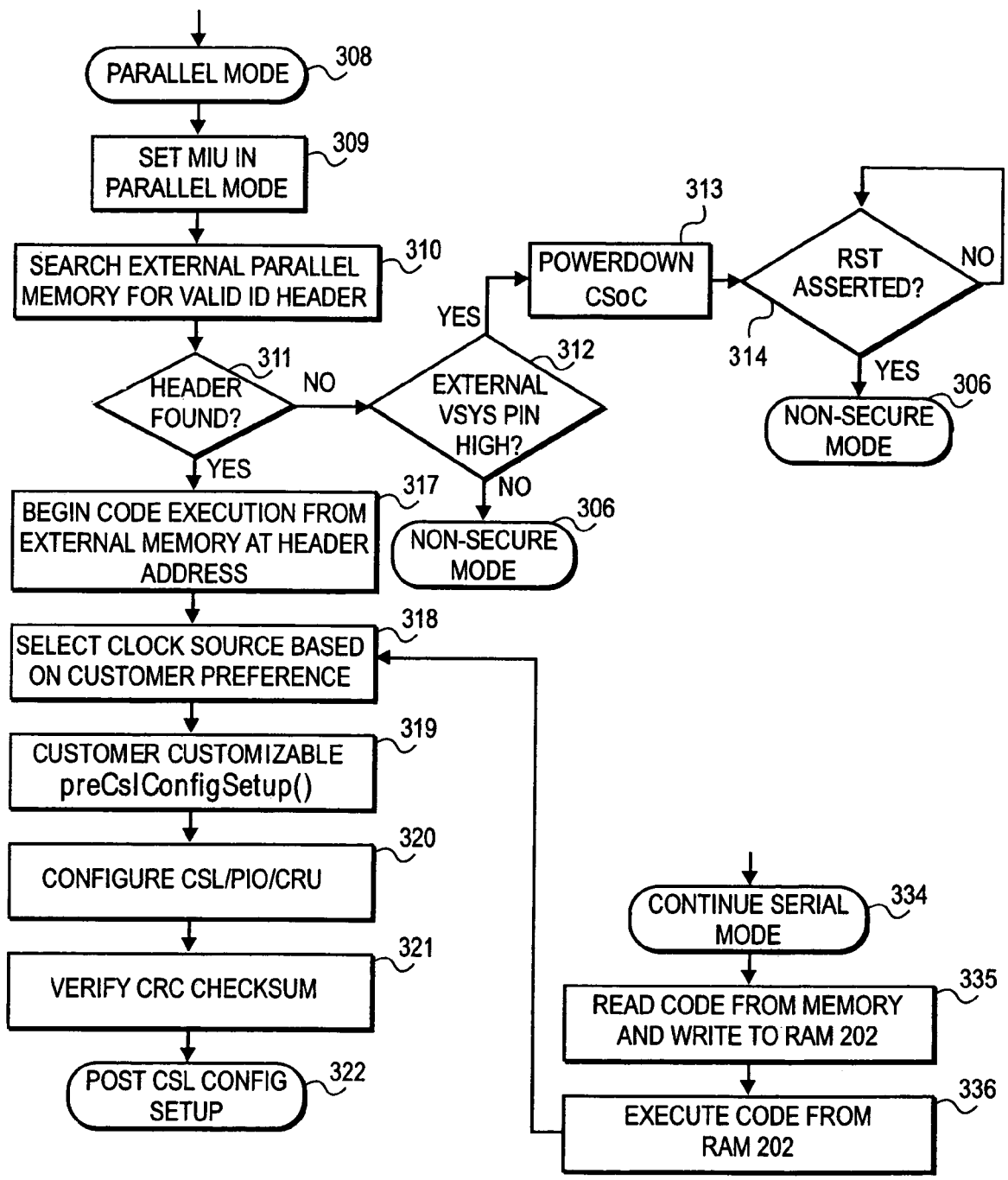
Figure 3C:
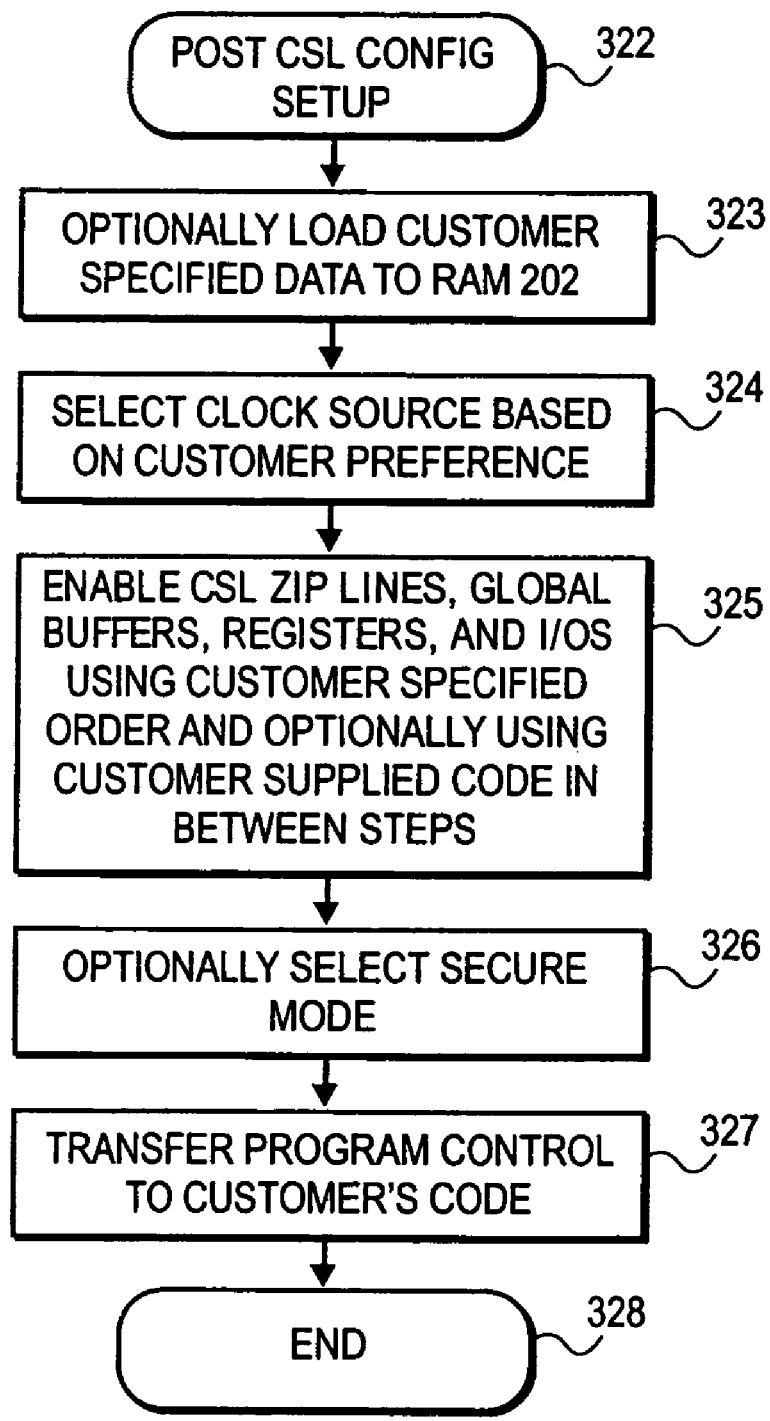

In accordance with the present invention, CSoC 101 advantageously uses an on-chip central processing unit (CPU) 206 during the configuration process. Specifically, CPU 206 executes a software program to write configuration data to the configuration memory cells of CSoC 101. Note that the configuration memory cells are found principally, but not exclusively, in CSL 201. Specifically, configuration memory cells are also included in PIOs 201A. FIG. 3, which comprises FIGS. 3A-3C, is a flow chart of the configuration process in CSoC 101. After power-on in step 301, MIU 204 (FIG. 2) initializes as a multi-chip slave (step 302) that can be accessed by multiple external memory devices. If CSoC 101 is a slave chip, as indicated by a logic one signal on the SLAVE pin (not shown in FIG. 1), CPU 206 is held in reset (step 303). If the signal on the SLAVE pin is a logic zero, thereby indicating that CSoC 101 is the master chip, then CPU 206 takes control and begins to execute the initialization code stored in non-volatile memory 203 (step 304). In one embodiment, the initialization code is divided between non-volatile memory 203 (internal) and memory device 103 (external), wherein non-volatile memory 203 stores only a standard start-up sequence and memory device 103 stores the user-specific code (described in detail in reference to steps 318, 319 and 325).

In step 305, CPU 206 determines if CSoC 101 should stay in a secure mode. In FIG. 2, there are two points of access to CSoC 101: JTAG connector 102 and memory device 103. Other environments may provide fewer or more points of access. In accordance with the present invention, a user may choose between various levels of security. Specifically, in FIG. 2, JTAG connector 102 or memory device 103 may be selectively disconnected (individually or in combination) from or remain connected to CSoC 101. This security designation is translated into executable code and stored in memory device 103. As indicated previously, CPU 206 may read a portion of memory device 103 in step 304. In one embodiment, the user directs CPU 206 to deny access to JTAG connector 102 as well as to external memory 103, thereby preventing any readback of the user's design. If memory device 103 is disconnected, then CSoC 101 must have been previously programmed, i.e. all values already loaded into the configuration memory cells, and a reset function triggered. If CSoC 101 should be in a secure mode, CPU 206 executes the code stored in RAM 202 in step 305A. Otherwise, CSoC 101 enters a non-secure mode 306.

A non-secure mode indicates that CSoC 101 will operate in conjunction with external resources, such as memory device 103. Therefore, in step 307, CPU 206 checks whether memory device 103 is a parallel or serial device. As shown in FIG. 1, memory device 103 is a parallel device. Thus, at this point, CSoC 101 would enter a parallel mode 308. In step 309, MIU 204 is set in parallel mode. Specifically, in one embodiment, CPU 206 initially sets key timing parameters to facilitate accessing the slowest available memory device on the market and then accelerates the access as appropriate for the specific memory device.

In step 310, CPU 206 searches in memory device 103 for a valid identification (ID) header. In accordance with the present invention, multiple configuration files may be stored in memory device 103. These files may be associated with different devices or different functions performed by CSoC 101. The ID header identifies a valid configuration file in memory device 103.

If a header is not found in step 311, then CPU 206 determines whether a signal on the VSYS pin of CSoC 101 is high in step 312. The VSYS pin is connected to the power supply of devices external to CSoC 101, such as memory device 103. If the power supply to CSoC 101 (pin VCC) is, for example, 3.3 volts and the power supply to memory device 103, is 5 volts, then memory device 103 might not be fully powered up and thus not accessible at the time CPU 206 searches in memory device 103 for a valid ID header. The present invention ensures that CPU 206 is given an opportunity to search for the header when memory device 103 is accessible. Therefore, if the VSYS signal is low in step 312, CPU 206 returns to non-secure mode 306 to begin another read cycle.

On the other hand, if the VSYS signal is high, then memory device 103 is accessible and CPU 206 should have been able to find a valid ID header. Therefore, either a valid ID header is not present or the data stored in memory device 103 is corrupted. Either case requires user intervention or correction before the configuration can continue. Therefore, CSoC 101 is powered down in step 313. Once powered down, CPU 206 waits until it receives a reset (RST) signal from the user in step 314. At this point, CPU 206 returns to non-secure mode 306.

If a header is found in step 311, then CPU 206 begins code execution (step 317) from memory device 103 at the address indicated by the header. In one embodiment, the header includes executable code to trigger this CPU process.

After code execution begins, CPU 206 selects the user-designated clock source in step 318. CSoC 101 may include an internal ring oscillator (not shown), or may be coupled to multiple external clock sources (such as a crystal oscillator (FIG. 1) via terminals XTAL1 and XTAL2). Selection between multiple clock sources is generally implemented with a multiplexer as shown by clock control 208 in FIG. 2. This choice of clock sources provides optimal flexibility in configuration speed to the user.

In step 319, CPU 206 executes a routine, if necessary, which synchronizes external system resources (if present) connected to system bus 205. Generally, the configuration process requires significant data transfers. The present invention advantageously provides a selectable interrupt or wait command in step 319 before this data transfer occurs. In one embodiment, CPU 206 waits for authorization from these external system resources before continuing the configuration process. For example, if external memory 103 is a dual-ported memory, then in step 319 CPU 206 may receive an instruction to wait until that dual-ported memory is fully loaded.

In step 320, CPU 206 sets up the parameters for a DMA transfer, then DMA controller 207 takes over as the master of system bus 205. Using DMA controller 207 as a bus master rather than CPU 206 reduces the number of clock cycles needed for configuration, thereby reducing power consumption. At this point, DMA controller 207 uses system bus 205 and MIU 204 to configure the internal programmable resources of CSL 210 and PIOs 201A. Additional internal programmable resources of CSoC 101, such as the control register unit (CRU) which is distributed throughout CSoC 101, may also be programmed at this time. The CRU is the repository of all control bits for semi-custom gates. Thus, the sequencing that will be discussed in reference to step 325, for example, is controlled by the CRU. Either CPU 206 or DMA controller 207 programs the CRU.

Note that the present invention allows other bus masters to configure CSoC 101. As noted previously, system bus 205 is a multi-master bus. Therefore, in another embodiment of the present invention, CPU 206 performs the configuration of CSL 210 and PIOs 201A. In yet another embodiments, an external device to CSoC 101, such as another CSoC or a memory device containing executable code, communicates with CPU 206 via MIU 204 and system bus 205, becomes master of system bus 205, and continues the configuration of CSoC 101. In yet a further embodiment, an external device communicates with CPU 206 via JTAG interface 102 and system bus 205, becomes master of system bus 205, and continues the configuration of CSoC 101. For purposes of illustration only, the following description assumes that DMA controller 207 is bus master starting in configuration step 320.

During the transfer of data from memory device 103 to the above-mentioned internal resources, DMA controller 207 runs a verify CRC checksum algorithm in step 321 to improve the integrity of those data signals. This CRC checksum algorithm and the use of DMA controller 207 to run this algorithm are well known in the art and therefore are not explained in detail herein.

Assuming all data is transferred successfully, as verified by DMA controller 207 in step 321, CPU 206 enters the post CSL configuration setup stage 322. In this stage, other user-specified data may be loaded into RAM 202 (step 323). This user-specified data may include values for lookup tables (LUTs) and registers in CSL 201, specific configuration memory locations in CSL 201, the CRU, or programs to be run by CPU 201 in the user mode.

In one embodiment, the values written to RAM 202 include information for partial reconfiguration of the programmable resources in CSL 201 during the user mode. Because many programmable logic designs include repetitive sections, this aspect of the present invention saves considerable silicon real estate and time.

At this point, CSoC 101 is essentially programmed. However, before entering the user mode, the clock source of CSoC 101 may again be chosen as indicated in step 324. This step, performed by CPU 206, allows the user to select different clock sources for the configuration mode and the user mode. For example, some users prefer a fast configuration mode, but need a low power (i.e. slower) user mode. Other users have no timing requirements during configuration, but want to maximize system performance during the user mode, for example by using high speed clock generation circuitry including a phase locked loop. Thus, the present invention advantageously provides the user maximum flexibility in the selection of the clock source, both in the configuration mode as well as in the user mode.

In accordance with the present invention, step 325 ensures proper system synchronization by allowing the user to determine the enablement sequence of various elements of CSoC 101. In one embodiment, the enablement sequence is provided by the user during the capture of the user's logic design and the appropriate instructions are generated by the programming software and loaded into memory device 103. Alternatively, the user may provide proprietary executable code including the instructions for the enablement sequence. In either case, these instructions are read by CPU 206, which controls the synchronization process. The following areas of selective enablement may be included in step 325: CSL zip buffers and input multiplexers (explained in detail in reference to FIGS. 7A and 7B), global buffers (used for clock, high fan-out, or reset signals), registers (i.e. flip-flops), and lookup table (LUT) RAM in CSL 201.

CPU 206 also controls the selective enabling of PIOs 201A in step 325, thereby providing certain output signals before other output signals from CSoC 101. A more detailed description of PIOs 201A is provided in U.S. patent application Ser. No. 09/418,416, filed on Oct. 15, 1999 and entitled "An Input/Output Circuit With User Programmable Functions", now U.S. Pat. No. 6,624,656 B1 issued on Sep. 23, 2003 which is incorporated by reference herein.

In one embodiment, the zip buffers are enabled first, followed by the global buffers, the registers, and the PIOs (a typical programmable logic device sequence) to ensure that CSoC 101 drives the proper output signals to the external system. In another embodiment, the registers and PIOs of CSoC 101 are enabled and the system external to CSoC 101 is allowed to stabilize before the zip and global buffers are enabled.

Finally, also during step 325, CPU 206 allows for the inclusion of customer, i.e. executable, code into the sequence, thereby providing optimal flexibility to the user.

In step 326, the user may selectively put CSoC 101 into a secure mode. In this manner, CSoC 101 will not read from any external devices unless a power-down cycle is triggered. In one embodiment, the secure mode allows reading from only certain devices, such as memory device 103 or JTAG connector 102, or neither. In the secure mode, if a reset signal is received, CPU 206 returns to step 305A and executes the user code from RAM 202.

If a non-secure mode is chosen, then in step 327, program control is transferred to the user code residing in memory device 103 (note that even in a non-secure mode, CPU 206 can still access non-volatile memory 203). Accessing memory device 103, although somewhat slower and higher in power consumption because of toggling input/output circuits, allows access to significantly larger memory resources. The configuration mode ends in step 328, thereby triggering the user mode.

As described in further detail below, the present invention advantageously not only allows multiple memory devices to be connected to CSoC 101, but also allows various types of memory devices to be accessed, thereby significantly increasing user flexibility. For example, returning to step 307, if the external memory has a serial interface, then a serial mode begins in step 330. In this mode, CPU 206 sets MIU 204 in the serial mode (step 331), resets the address pointer in the external memory device (step 332), and then searches for a valid ID header in that memory device (step 333). If a valid ID header is not found, CPU 206 will assume another type of memory device is connected to CSoC 101, and will automatically switch over to the parallel mode 308. However, if the valid ID header is found in the external memory device, then the serial mode is continued in step 334. Specifically, the program portion of the code is transferred in step 335 from the external memory device to RAM 202 and executed by CPU 206 in step 336. At this point, CPU 206 continues the configuration process as indicated in steps 318-328.

System Bus Resources

In accordance with the present invention, system bus 205 may be used for both configuration data transfer and general interconnect. This dual use provides significant silicon savings compared to conventional field programmable logic devices that require dedicated wires on chip to connect the external memory device to the configuration memory cells.

Figure 4:
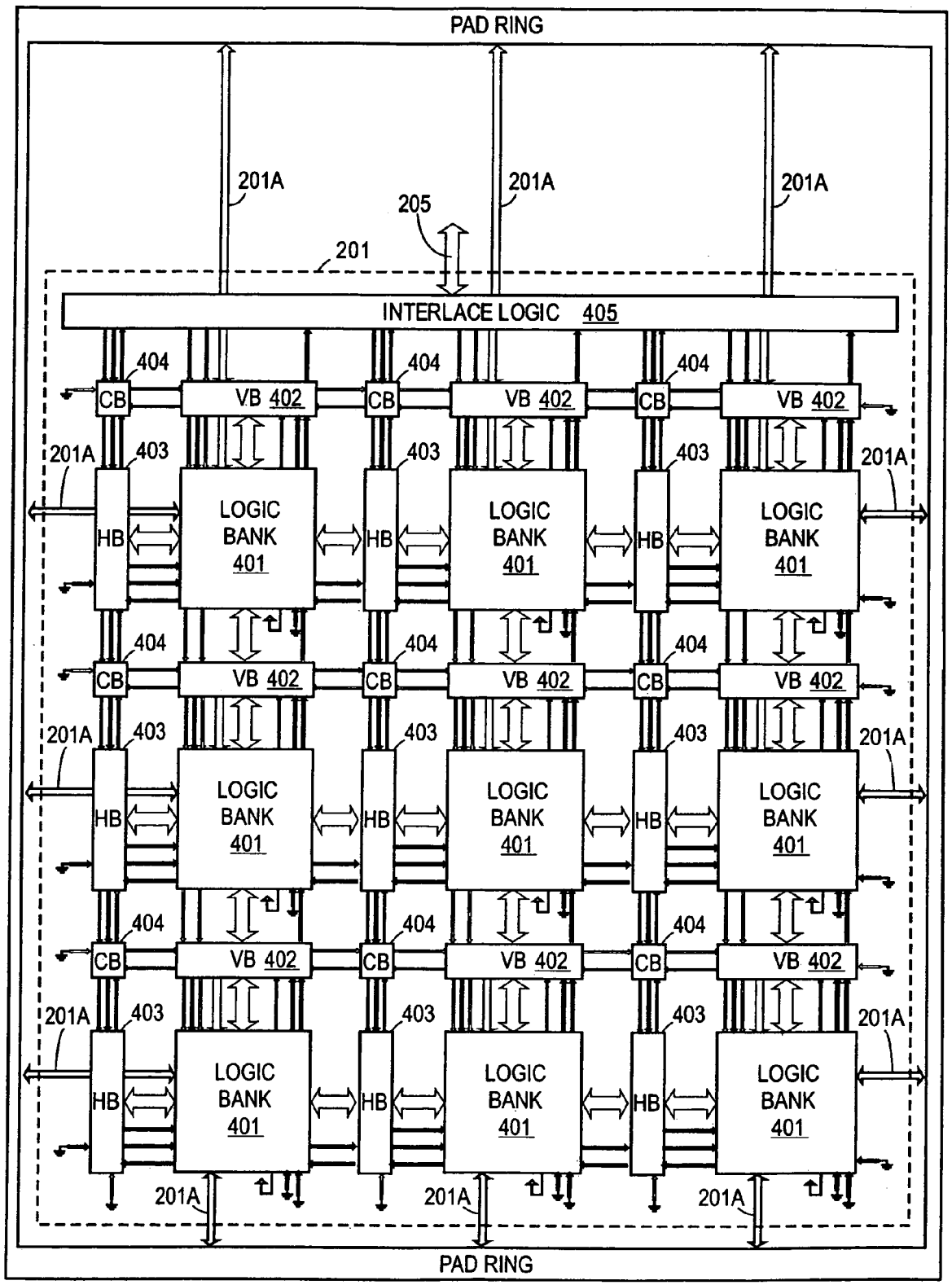
FIG. 4 shows a block diagram of the configurable system logic including logic banks, horizontal breakers, vertical breakers, corner breakers, and interface logic.

FIG. 4 illustrates one embodiment of CSL 201 in which a plurality of logic banks 401 are arranged in rows and columns. Relative to every logic bank 401, a vertical breaker 402 is positioned on the top edge, a horizontal breaker 403 is positioned on the left edge, and a corner breaker 404 is positioned in the left corner. In this embodiment, interface logic 405 distributes address signals down every column defined by corner breakers 404 and horizontal breakers 403.

Figure 5A:
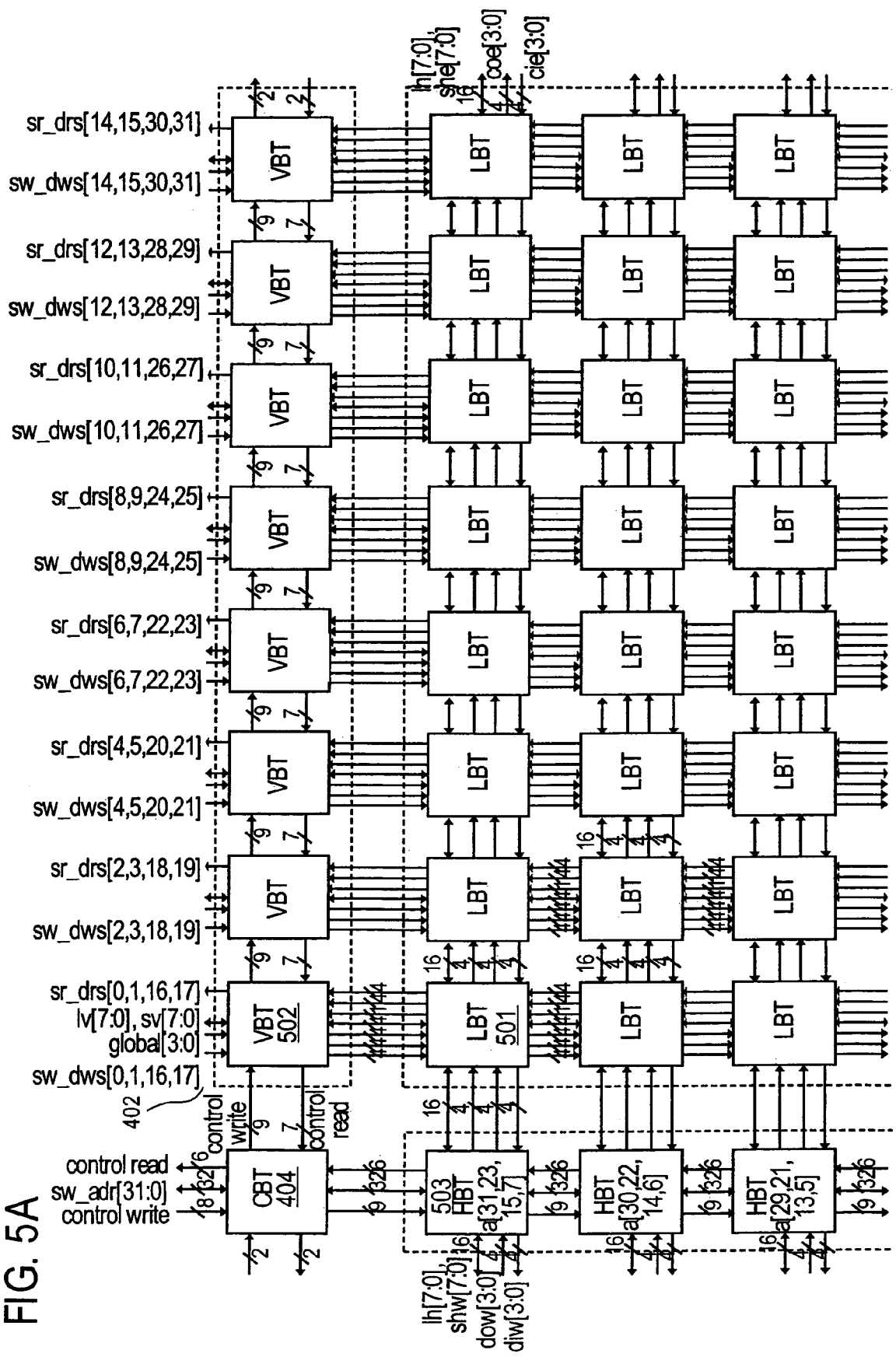
FIGS. 5A and 5B, illustrates further details of a logic bank, a horizontal breaker, and a vertical breaker.
Figure 5B:
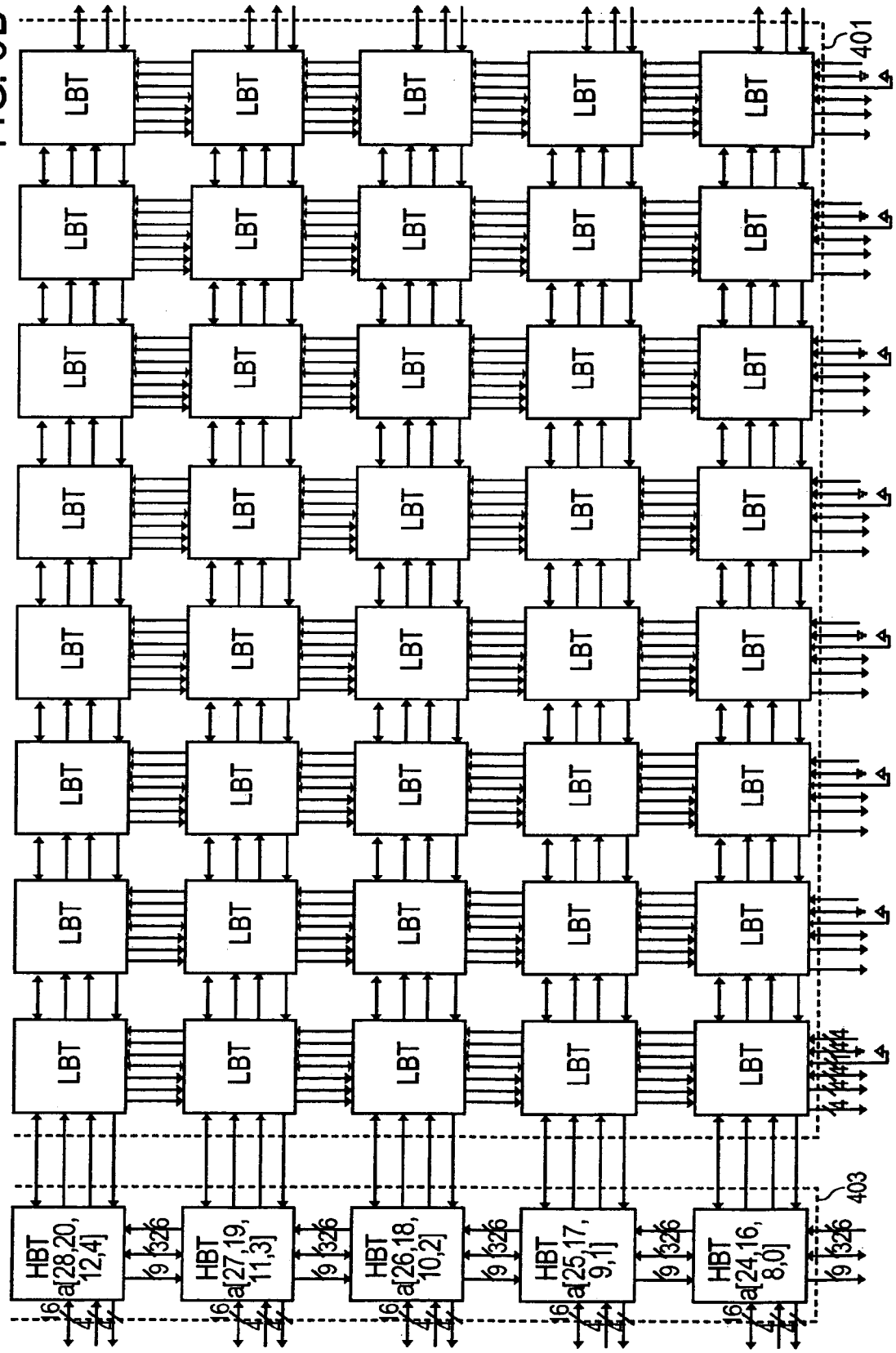

Specifically referring to FIG. 5, which comprises FIGS. 5A and 5B, from each corner breaker 404, the address signals sw_adr[31:0] are distributed to the horizontal breaker 403 immediately below the corner breaker 404. These address signals are then distributed to the logic bank 401 to the right of horizontal breaker 403. Selection of the configuration memory cells within each logic block tile 501 is performed using well known circuitry and methods and therefore is not discussed in detail herein.

Note that each logic bank 401 comprises an array of logic block tiles 501, each horizontal breaker 403 comprises an array of horizontal breaker tiles 503, and each vertical breaker 402 comprises an array of vertical breaker tiles 502. Breaker tiles (both horizontal and vertical) include programmable connections between certain general interconnect lines (long lines) in adjacent banks, structures for distributing power, ground, and clock signals, as well as system-level circuitry to integrate CSL 201 with other components in CSoC 101, such as CPU 206.

Interface logic 405 (FIG. 4) distributes write data signals sw_dws down every column defined by vertical breaker tiles 502 and logic bank tiles 501. In contrast, the read data signals sr_drs are propagated up through this same column to interface logic 405.

Figure 6:
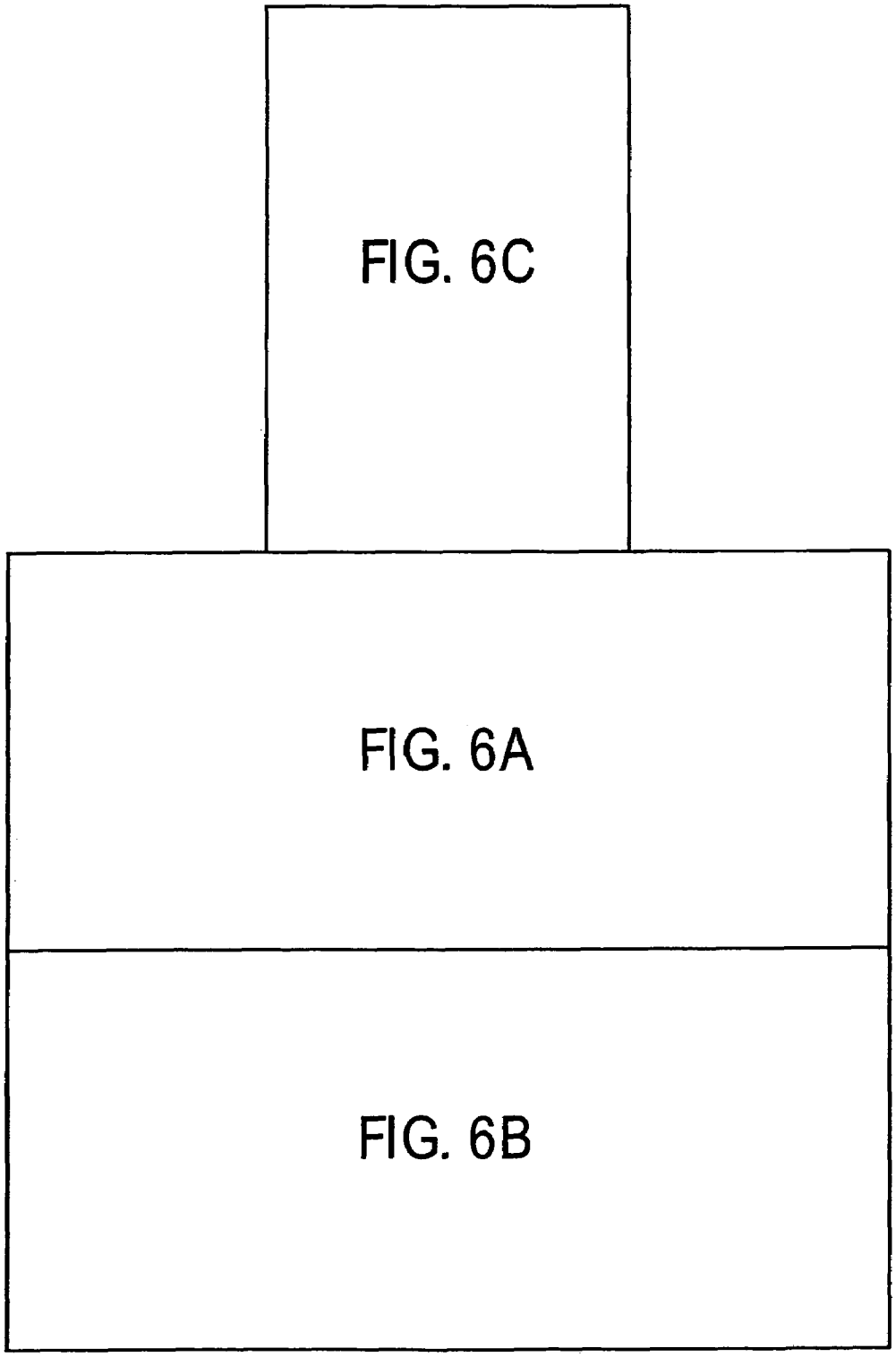
FIG. 6, comprising
Figure 6A:
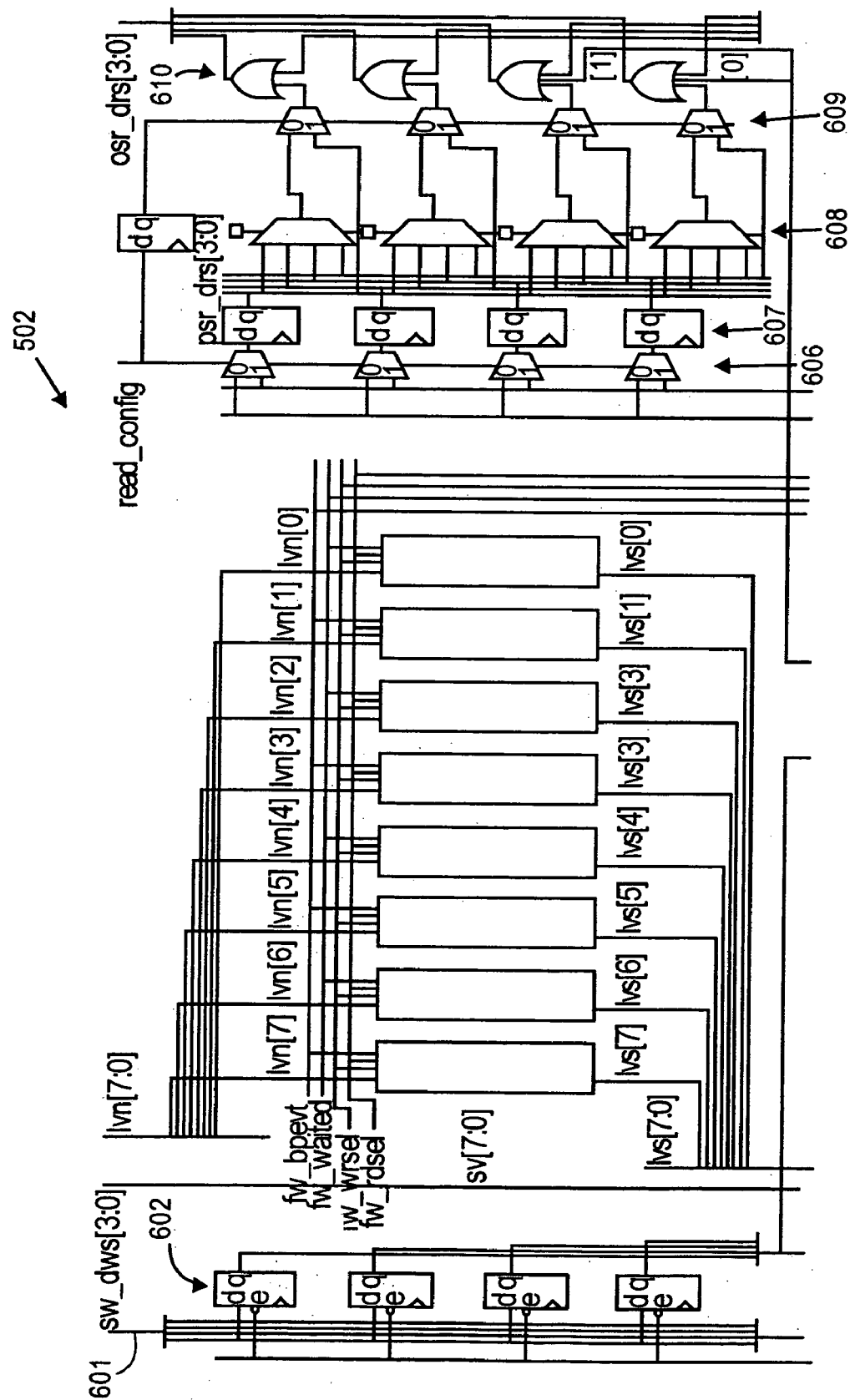
FIGS. 6A, 6B, and 6C shows a vertical breaker tile including multi-purpose buses.
Figure 6B:
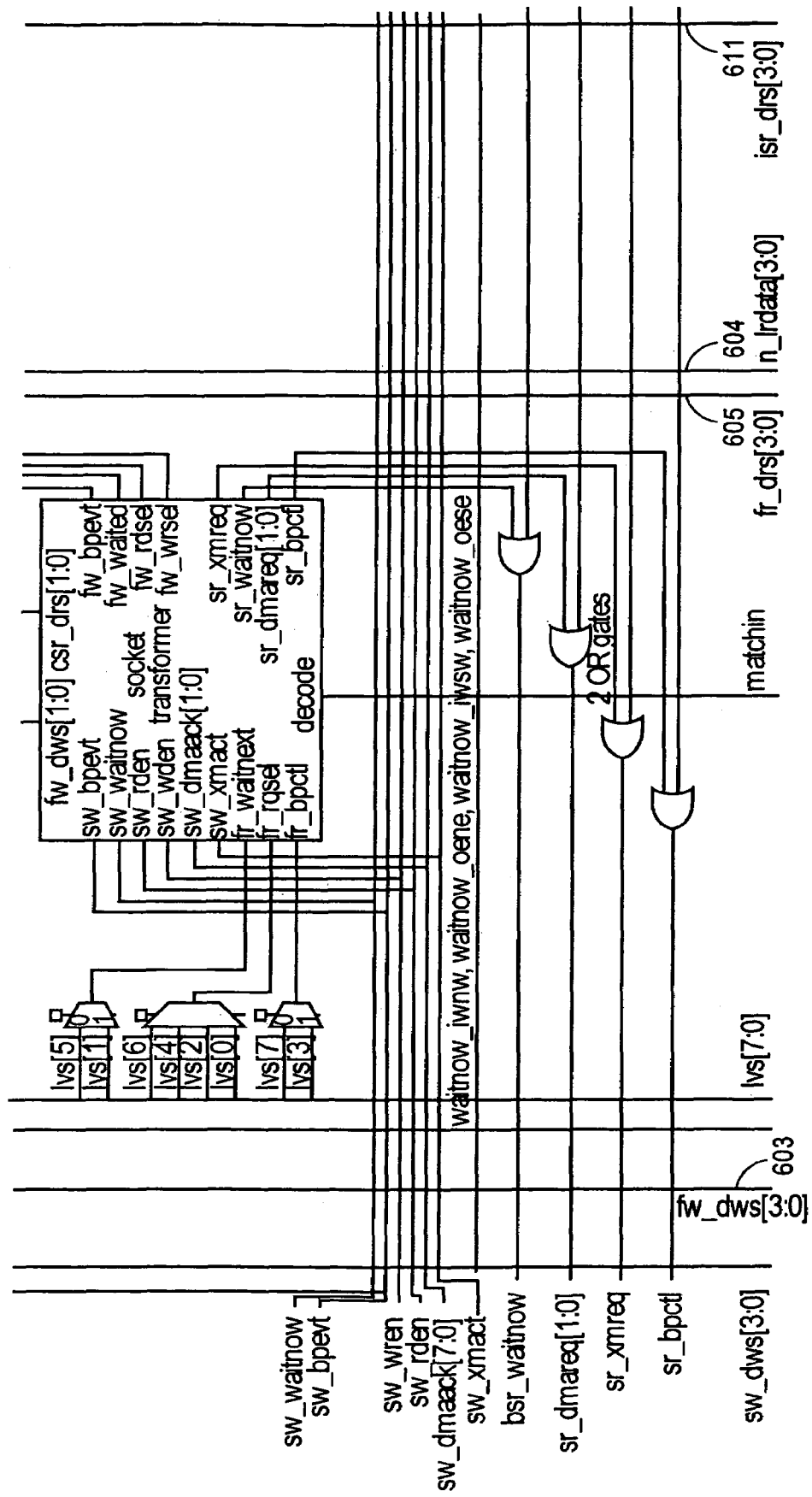
Figure 6C:
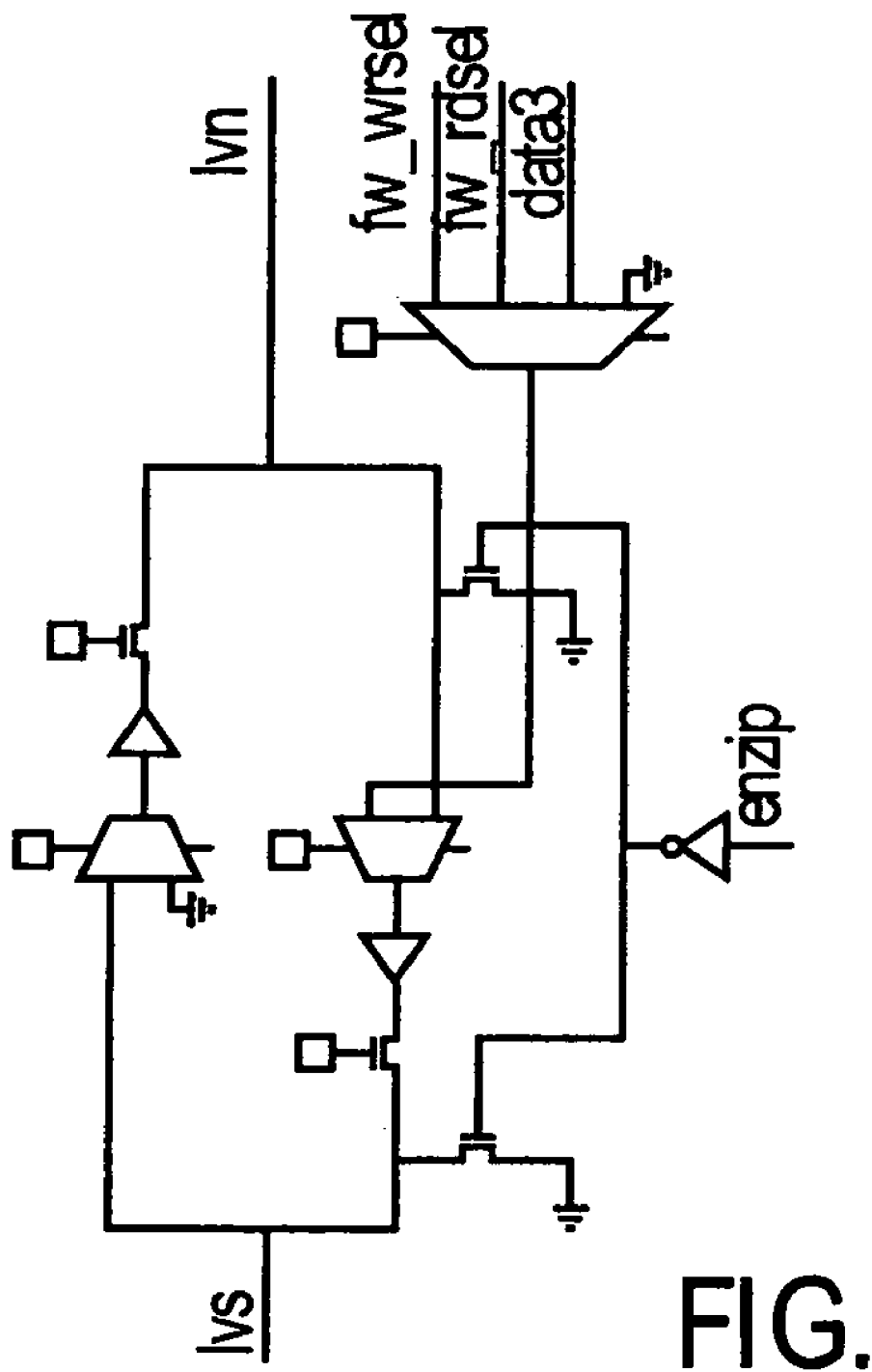

In accordance with the present invention, the buses for distributing the write data and read data signals can be used for both configuration memory and user data, thereby providing an extremely efficient and flexible resource on CSoC 101. FIG. 6, which comprises FIGS. 6A, 6B, and 6C, illustrates one embodiment of a vertical breaker tile 502 including such dual-purpose buses. Specifically, bus 601 distributes the write data signals sw_dws. Registers 602 provide a registered version of those signals (fw_dws) to the configuration memory cells in the appropriate logic block tiles 501. In this embodiment, the same data is provided to every logic block tile 501 in the column of tiles, thereby providing flexibility in the placement of resources connected to bus 601. Row select circuitry, well known to those skilled in the art, is used to determine which of those logic block tiles 501 should receive the configuration data.

In a similar manner, read data bus 611 can carry signals from the general interconnect via bus 605 or from the configuration memory cells via bus 604. Specifically, multiplexers 606 selectively provide general interconnect signals fr_drs or configuration memory signals n_Irdata. The selected signals are stored in registers 607, then provided to multiplexers 608. Although not used if configuration memory signals are selected, multiplexers 608 allow an arbitrary 4-way permutation of the assignment of the read data signals to facilitate placement and routing of user programmable logic. Multiplexers 609 receive the output signals of multiplexers 608 as well as the signals from registers 607 provided directly on bypass lines. If the signals in registers 607 are configuration signals, then multiplexers 609 are programmed to transfer the signals on the bypass lines. The output signals of multiplexers 609 are combined via OR gates 610 with the corresponding read data signals from an adjacent logic block tile in the same column, thereby forming bus 611. Thus, depending on the signal selection by multiplexers 606, bus 611 can be used for general interconnect in CSL 201 or for configuration read lines.

Determining the states of the configuration memory cells in logic block tiles 501 is highly advantageous in debug operations. For a more detailed description of such debug operations, see U.S. patent application Ser. No. 09/418,948, entitled "Bus Mastering Debugging System For Integrated Circuits", filed on Oct. 15, 1999, now U.S. Pat. No. 6,691,266 B1 issued on Feb. 10, 2004 and incorporated by reference herein.

Zip Buffers and Input Multiplexers

Figure 7A:
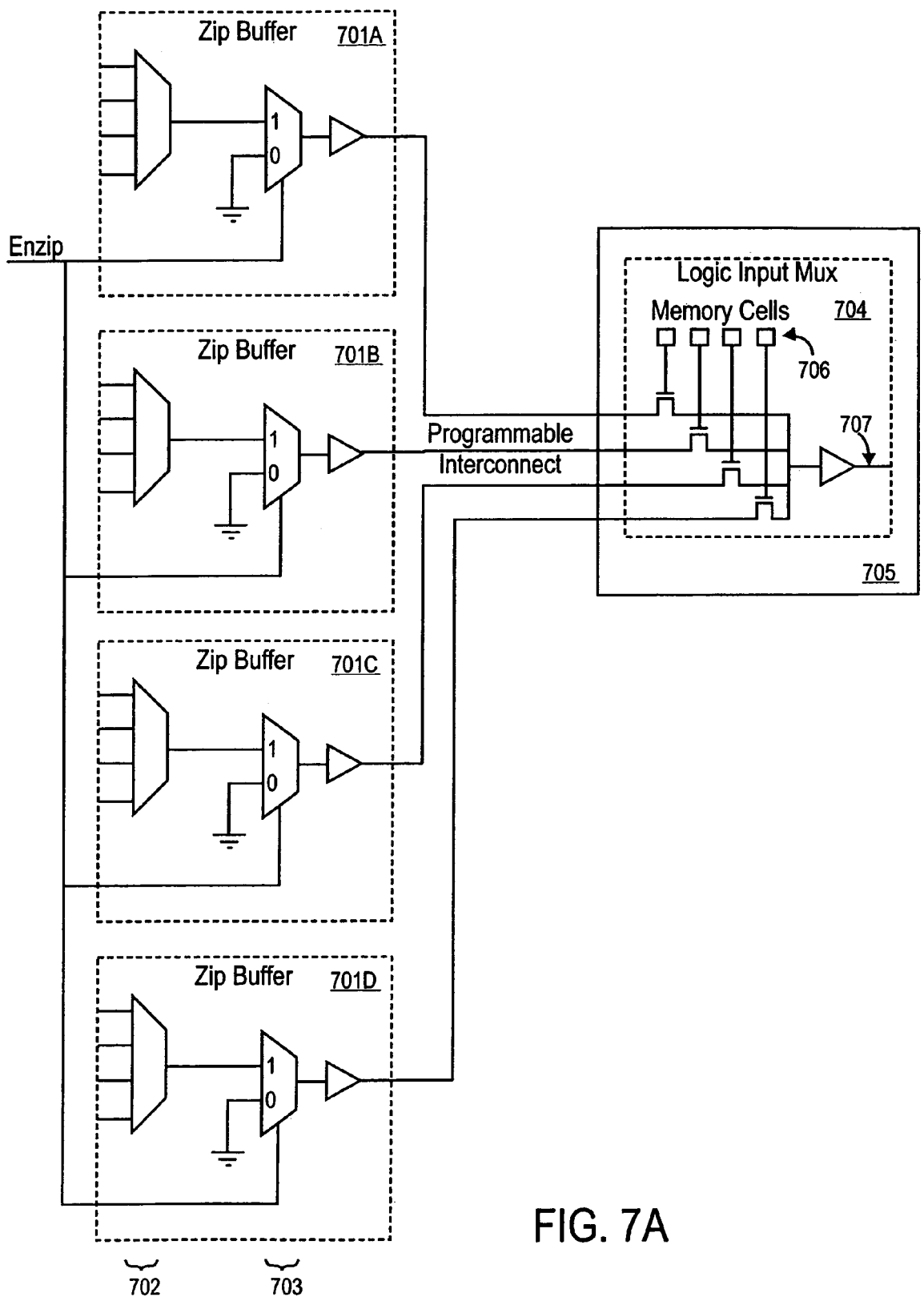
FIG. 7A illustrates one embodiment of zip buffers controlled by configuration memory cells.

The present invention provides programmable zip buffers and input multiplexers to the logic block tiles to eliminate contention during configuration. FIG. 7A illustrates zip buffers 701A-701D having a two-tier multiplexer structure in which signals from various lines in the general interconnect (single length lines and/or long lines) of CSL 201 are selectively chosen via multiplexers 702 and provided to multiplexers 703. If a logic one signal is provided to the control terminals of multiplexers 703, the interconnect signals are buffered and transferred to an input multiplexer 704 of a logic block tile 705. Depending on the logic states of memory cells 706, a selected interconnect signal is buffered and then provided on line 707.

In accordance with the present invention, CPU 206 ensures a logic zero Enzip signal is provided to the control terminals of multiplexers 703 until step 325. In this manner, only logic zeros are provided to all logic block tiles 705 (via input lines 707), thereby ensuring a clean start-up of CSL 201.

Figure 7B:
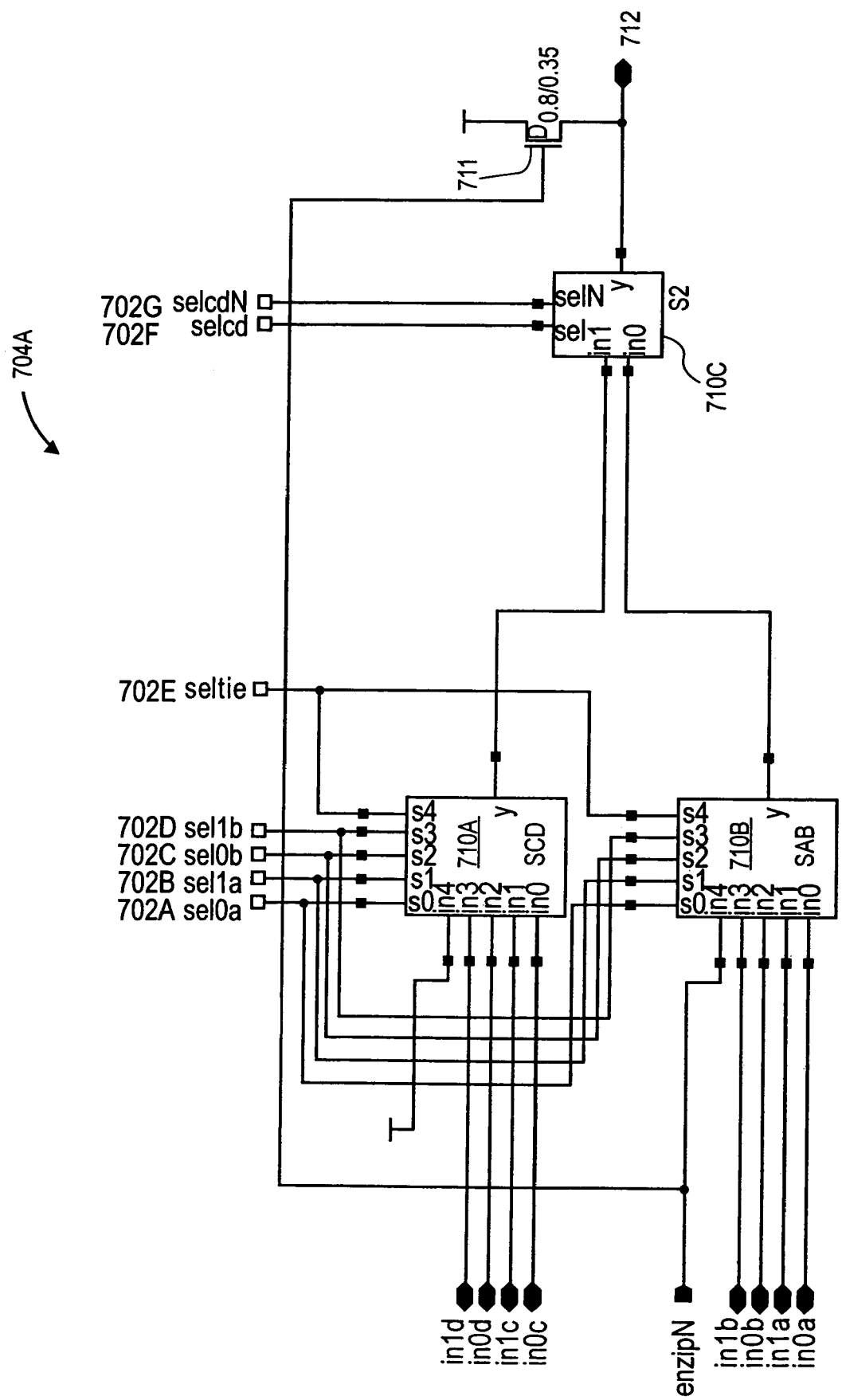
FIG. 7B shows one embodiment of an input multiplexer controlled by configuration memory cells.

FIG. 7B illustrates an embodiment of an input multiplexer 704A for a logic block tile. In this embodiment, two 5 to 1 multiplexers 710A and 710B each receive four input signals in0-in3. This embodiment assumes that all signals output from zip buffers 701 (FIG. 7A) are inverted. Thus, all input signals in0-in3 to multiplexers 710 are logic ones. Multiplexer 710A has one input terminal connected to voltage VCC, whereas multiplexer 710B has one input terminal connected to receive the inverted Enzip signal (EnzipN). Note that memory cells 702A-702D selectively pass signals in0-in3, respectively, whereas memory cell 702E selectively passes signal in4.

During configuration a logic one signal is provided to the gate of transistor 711 (Enzip=0, EnzipN=1), thereby turning on that transistor. Because transistor 711 is coupled to voltage VCC, a logic one signal is provided on line 712, the input line to a logic block tile (discussed in reference to FIG. 5). Thus, irrespective of the programming of memory cells 702A-702G, the signal on line 712 during configuration is constant (i.e. a logic one signal). Thus, the present invention advantageously eliminates any possibility of contention on line 712 to the logic block tile. Additionally, the present invention ensures that the internal logic of the CSL remains stable until configuration is complete.

Note that after configuration, the EnzipN signal mimics as a supply voltage, i.e. a constant logic zero signal. Thus, in the user mode, the present invention ensures a different, constant signal source for multiplexers 710A and 710B.

Synopsis

As mentioned previously, prior art FPLDs have dedicated wires to provide stored values to the configuration memory cells. Moreover, the prior art FPLDs provide dedicated hardware (i.e. shift registers) to load those values into the configuration memory cells. Both of these dedicated resources are used only during configuration.

In contrast, the present invention provides an extremely efficient use of system resources. As described above, the data buses provided in CSL 201 (and forming part of the system bus) can be multi-purpose, i.e. used for both configuration and user logic in the general interconnect. Moreover, the use of CPU 206 in the configuration process eliminates the need for dedicated hardware for memory cell loading.

As a further advantage of the present invention, all configuration memory locations in CSL 201 and storage locations in RAM 202 are mapped into the addressable memory space of system bus 205. This mapping provides significant advantages to the user. For example, any master of system bus 205 can read from or write to specific locations, thereby enhancing debug operations.

Thus, the present invention provides a silicon efficient programmable logic solution while at the same time providing users optimal flexibility in configuration and system resources.

The invention claimed is:

1. A method of initializing a configurable system on a chip (CSoC), the CSoC including configurable system logic (CSL), the method comprising:
   checking for one of a serial and a parallel output device external to the CSoC and coupled to a memory interface unit (MIU) in the CSoC;
   setting the MIU to a first mode of communicating with the output device, wherein the first mode comprises one of a serial mode and a parallel mode;
   searching for a header of a configuration file in the output device;
   switching the MIU to a second mode of communicating with the output device if a header of a configuration file is not found, wherein the second mode comprises the other of the serial mode and the parallel mode;
   determining if the output device is accessible if a header of a configuration file is not found after the MIU is switched to the second mode;
   powering down the CSoC if the output device is determined to be accessible and a header of a configuration file is not found after the MIU is switched to the second mode; and
   configuring the CSL if a header of a configuration file is found.

2. The method of claim 1, wherein if a header of a configuration file is not found in the second mode, then further including waiting for a reset signal to be asserted.

3. A system for initializing a configurable system on a chip (CSoC), comprising;
configurable system logic (CSL);
a memory interface unit; and
an output device external to the CSoC and coupled to the memory interface unit, wherein the memory interface unit is set to a first mode based on the output device, wherein the first mode comprises one of a serial mode and a parallel mode, and the CSL is configured if a header of a configuration file is found in the output device, and wherein the memory interface unit is set to a second mode if a header of a configuration file is not found in the output device, wherein the second mode comprises the other of the serial mode and the parallel mode, and the CSoC is powered down if a header of a configuration file is not found in the output device after the memory interface unit is set to a second mode and the output device is determined to be accessible.

4. The method of claim 1 further comprising determining that a valid ID header is not present if the output device is determined to be accessible.

5. The method of claim 1 further comprising determining that data stored in the output device is corrupted if the output device is determined to be accessible.

6. The method of claim 1 further comprising enabling the CSoC to search for a header of a configuration file if the output device is determined to be accessible.

7. The method of claim 6 wherein enabling the CSoC to search for a header of a configuration file if the output device is determined to be accessible comprises entering a non-secure mode.

8. The method of claim 7 further comprising a step of beginning a read cycle if the output device is determined to be accessible.

9. The system of claim 3 further comprising a system bus used for transferring configuration data and providing general interconnections.

10. The system of claim 3 further comprising buffers in the CSL enabling configuration, the buffers comprising first tier multiplexers coupled to general interconnect lines.

11. The system of claim 10 wherein the buffers further comprise second tier multiplexers having a first terminal coupled to an output terminal of a first tier multiplexer and a second terminal coupled to a constant voltage source.

12. The system of claim 11 wherein the second tier multiplexers provide the constant voltage source during a configuration mode and provide signals from the general interconnect lines during a user mode.

13. The system of claim 12 further comprising input multiplexers coupled to the buffers in the CSL, the input multiplexers enabling configuration and having a first multiplexer coupled to receive a first plurality of input signals and a constant signal, a second multiplexer coupled to receive a second plurality of input signals and a mode signal, and a third multiplexer coupled to receive output signals of the first and second multiplexers.

14. A method of initializing a configurable system on a chip (CSoC), the CSoC including configurable system logic (CSL), the method comprising:
checking for one of a serial and a parallel memory device external to the CSoC and coupled to a memory interface unit (MIU) in the CSoC;
setting the MIU to a first mode of communicating with the memory device, wherein the first mode comprises one of a serial mode and a parallel mode;
searching for a header of a configuration file in the memory device;
switching to a second mode of communicating with the memory device if a header of a configuration file is not found, wherein the second mode comprises the other of the serial mode and the parallel mode;
determining if the memory device is accessible if a header of a configuration file is not found when the CSoC is in the second mode;
continuing to search for a header of a configuration file when the memory device is determined to be accessible, and
powering down the CSoC if the memory device is determined to be accessible and a header of a configuration file is not found after the MIU is switched to the second mode.

15. The method of claim 14 further comprising returning to a non-secure mode to begin a read cycle if the memory device is determined to be not accessible.

16. The method of claim 14 further comprising determining that a header for a configuration file is not present or data stored in the memory device is corrupted if the memory device is determined to be accessible.

17. The method of claim 14 further comprising initially setting timing parameters to enable accessing a slowest memory device of a plurality of available memory devices.

18. The method of claim 17 further comprising adjusting timing parameters based upon a selected memory device of the plurality of available memory devices.

19. The method of claim 17 further comprising selecting a first clock signal for operating in a configuration mode and selecting a second clock signal for operating in a user mode.

* * * * *